Nov. 30, 1971    L. BUSNIAK    3,623,273
APPARATUS FOR ECCENTRIC MACHINING OF ELECTRODES
Filed March 10, 1970    3 Sheets-Sheet 2

INVENTOR
LUBOMIR BUSNIAK
BY
ATTORNEY

INVENTOR
LUBOMIR BUSNIAK
BY
ATTORNEY

United States Patent Office
3,623,273
Patented Nov. 30, 1971

1

3,623,273
APPARATUS FOR ECCENTRIC MACHINING OF ELECTRODES
Lubomir Busniak, Nove Mesto nad Vahom, Czechoslovakia, assignor to Vyskumny ustav mechanizacie a automatizacie, Nove Mesto nad Vahom, Czechoslovakia
Filed Mar. 10, 1970, Ser. No. 18,171
Int. Cl. B24b 7/00, 9/00
U.S. Cl. 51—119     7 Claims

ABSTRACT OF THE DISCLOSURE

Apparatus for machining electrodes comprising a hollow spindle rotatable about a central axis, a linearly reciprocal rod mounted within the spindle, a support drivingly engaged by the spindle and a bushing mounted on the support for receiving a work tool carrier. The bushing is angularly adjustable about the support by connecting means with the rod which translates the linear motion of the rod into rotary adjustment of the bushing.

BACKGROUND OF THE INVENTION

The present invention relates to apparatus for machining electrodes and in particular to apparatus for controlling the eccentric machining of carbon or graphite electrodes.

The use of carbon or graphite electrodes are preferred in modern arc welding, arc heating and similar processes. The production of such electrodes from pressurized or densified material requires the use of profiling tools having a negative shape, to that of the electrode, and comprises the grinding of the material by imparting to the tool an eccentric circular or orbital movement.

Conventionally the eccentric motion is obtained by the use of complex levers or gearing systems which do not provide the high degree of accuracy, efficiency and control required to produce the precisely formed and shaped electrodes necessary.

It is the prime object of the present invention to provide apparatus for holding and imparting to the machining tool an orbital eccentric motion.

It is another object to provide apparatus for the machining of electrodes which is highly accurate and efficient.

It is another object to provide apparatus for the machining of electrodes which may be simply and easily adjusted to vary the degree of eccentricity of the machining tool.

It is still another object of the present invention to provide apparatus for machining electrodes which significantly shorten the time required to produce electrodes.

It is another object of the invention to provide apparatus for machining electrodes which can be employed to repair and refurbish worn electrodes so as to substantially prolong their life.

These and other objects as well as advantages will be readily apparent from the following disclosure.

SUMMARY OF THE INVENTION

According to the present invention there is provided apparatus for machining electrodes comprising a hollow spindle rotatable about a central axis, a linearly reciprocal rod mounted within the spindle, a support drivingly engaged by the spindle and a bushing mounted on the support for receiving a work tool carrier. The bushing is angularly adjustable about the support by connecting means with the rod which translates the linear motion of the rod into orbital adjustment of the bushing.

2

In the preferred form the connecting means includes a pair of pinions having intermeshing gears with a rack located on the rod and gear on the bushing.

Other details and features of the present invention will be seen from the following description and from the drawings attached.

BRIEF DESCRIPTION OF THE DRAWINGS

Turning now to FIG. 1 there is seen a generally hollow rectangular housing comprising a body 10 open at its bottom and having a cap 12 at its forward end. The body 10 is provided with a pair of spaced annular bearing posts 14 on each which is secured a roller bearing 16. An elongated tubular spindle 18 is supported within bearings 16 along the central longitudinal axis X—X of the apparatus. Keyed about the outer surface of the spindle 18 is a circular drive gear 20 which meshes with the output shaft of a suitable drive mechanism 22 located exteriorly of the housing. The drive mechanism 22 is conventionally operated to cause rotation of the spindle 18.

Figure 1:
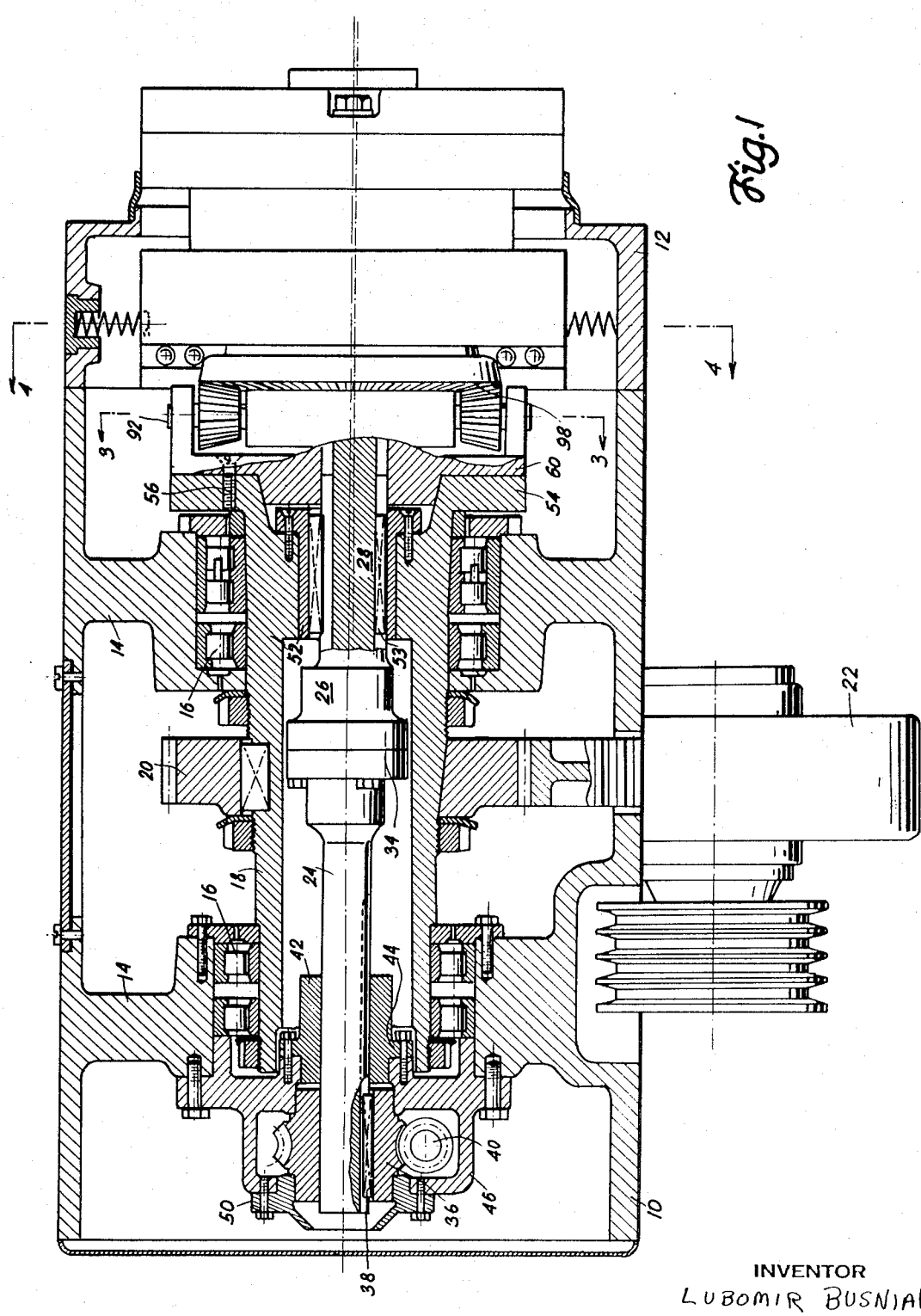
FIG. 1 is a longitudinal sectional view taken in a vertical plane of the machine according to the present invention.
Figure 2:
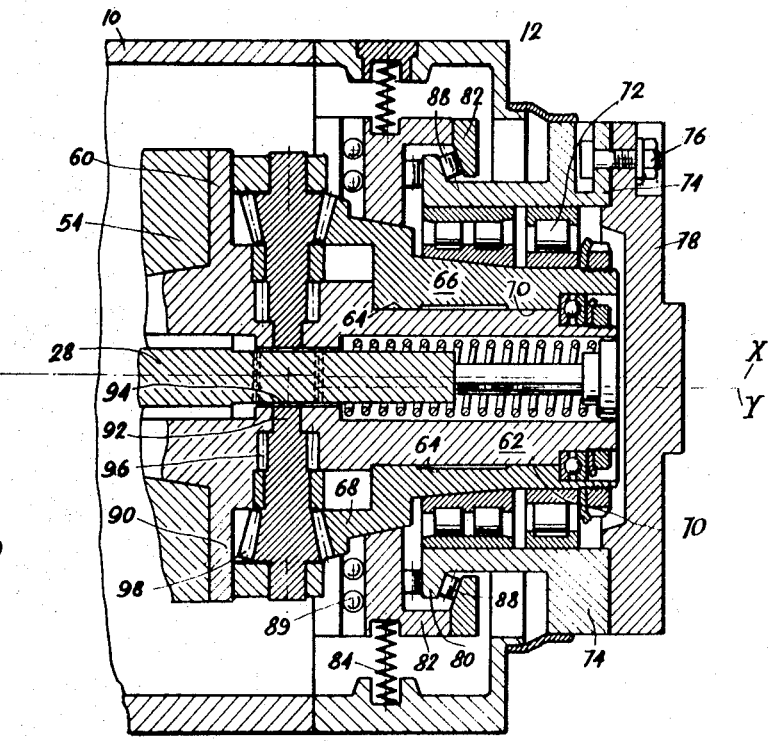
FIG. 2 is an enlarged view of the forward end portion shown in FIG. 1.

Mounted centrally along the axis X—X, within the interior bore of the spindle 18 is a rotatable lead screw 24 from which extends a tubular sleeve 26 in which is mounted an extension rod 28 of square cross section. The rod 28 is provided (FIG. 4) with an elongated rack 30 on its right side and an elongated rack 32 on its left side while its upper and lower edges or sides are smoothly planed. The lead screw 24 and rod 28 are operatively joined by a coupling 34 to be described later herein, suitably designed to translate the rotary motion of the screw into linear reciprocal movement of rod 28 while permitting the rod 28 to be rotatable about the X—X axis.

The rear end of the lead screw 24 has a circular worm gear 36 slidingly attached to it by suitable feather key means 38. The circular worm gear 36 meshes with a tangentially extending worm 40 by which means the lead screw 24 may be angularly adjusted. The lead screw 24 is supported at its rear end within an internally threaded bearing 42 and is furnished a radially extending flange 44 which fits into a cut down portion at the terminal end of the spindle 18. The cut down portion provides a shoulder against which the flange 44 rests and which limits the forward axial movement of the bearing 42. A threaded cap 46 is secured to the exterior of the bearing 42 and abuts against the rearmost post 14 to guide the axial movement of the lead screw 24 itself and as a result of its internal threading transforms the rotary motion into linear axial movement. The bearing 42, flange 44 and cap 46 may be separate parts, bolted or secured together, or they may be integrally formed in well known manner. The cap 46 has an axially extending curved member 48 which extends over the worm gear 36 and to which is secured a terminal cap 50.

The forward sleeve portion of the lead screw member 24 is slidingly supported within a bushing 52 secured within the interior bore of the spindle 18 and is keyed by feather wedge means 53 against movement. As a result of this construction the sleeve 26 and the rod 28 rotate together with the spindle 18.

The forward end of the spindle 18 flares radially outwardly to provide a circular flange 54 having a conically shaped inner bore 56 which together are adapted to receive and hold by screws 57 (FIG. 3) the rearward end of a support 58. The support 58 is a generally cylindrical member having a T-shaped vertical cross section forming a radial enlarged end 60 coaxially about the X—X axis and complementary to the conical bore 56 of the spindle to which it abuts. The support 58 also has a stem 62 extending forwardly of the cap 12 which cross sectionally (FIG. 6) has center O in a neutral position coincide with a longitudinal axis Y—Y parallel to the axis X—X but off-set therefrom and a cylindrical outer surface 64 symmetrical thereabout. The enlarged end 60 is firmly connected with the flaring flanges 54 of the spindle, causing it to rotate about the X—X axis engaging it in clutch-like manner, while the stem 62 is caused to rotate eccentrically about the axis X—X.

Figure 6:
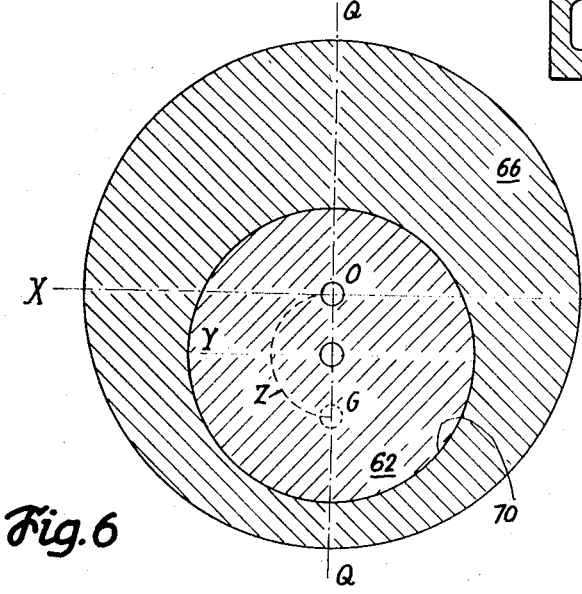
FIG. 6 is a schematic view of the adjustability features of the present device.

A conical bushing 66 having an annular flange-like base 68 and a cylindrical eccentric bore 70, is freely arranged over the stem 62 of support 58. The outer conical surface of the bushing 66 is in cross section concentric with the axis X—X while the bore 70 is concentric with the axis Y—Y having a center C (FIG. 6) coincident with this axis. The eccentricity of bore 70 is equal to the eccentricity of the cylindrical surface 64 of the stem 62 so that, advantageously, if the bushing 66 is rotated about the stem 62 in one direction, the eccentricities compensate for each other, while if the bushing 66 is rotated in the relative opposite direction they become additive. As seen in FIG. 6, the stem 62 and bushing 66 are in neutral position when their respective centers C and O lie along a vertical line Q—Q. Consequently any point on the bushing 66 may be eccentrically positioned with respect to the axis X—X by rotatable adjustment of the bushing 66 so as to perform an orbital movement about the X—X axis. The manner of adjustment will be described later herein.

Figure 4:
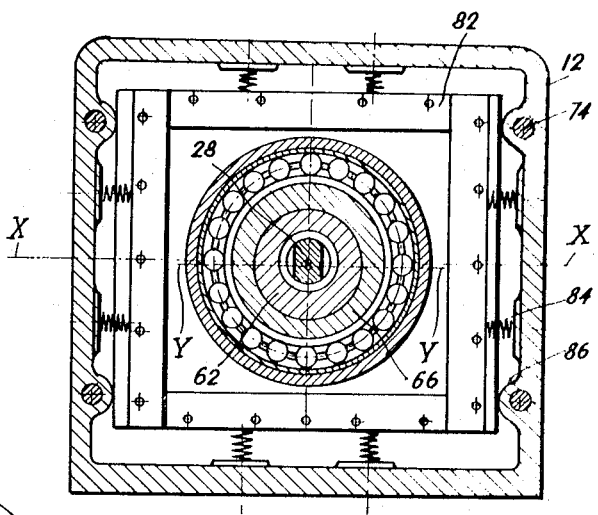
FIG. 4 is a sectional view taken along lines 4—4 of FIG. 1.

Mounted on the outer surface of the bushing 66 is the inner race element of a roller thrust bearing 72 which includes a plurality of roller members and an outer race element to which is secured longitudinally slidable carrier 74. The forward end of the carrier 74 is provided with a circular flange on which is mounted, by suitable bolt fasteners 76, the tool holder 78. The rear end of the carrier 74 is rectangular in shape and is provided with extending flanges 80 which are slidingly mounted within the bight of a rectangular frame 82 having a U-shaped cross section. The frame 82 is resiliently mounted by conventional spring bearing means 84 and longitudinal guides 86 within the box-like construction of the cap 12 so as to be "free floating" as seen in FIG. 4. Thus if the bushing 66 is positioned in any degree, eccentric with respect to the X—X axis, the tool holder will perform an orbital movement while retaining permanent alignment with respect to any axis perpendicular to the X—X axis.

A plurality of rollers 88 are provided between the surfaces of the carrier flange 80 and the frame 82 to permit the carrier 74 to slide. The rear end of the frame 82 is wedged against ball bearings 89 which ride against the bearing post 14 and allow a sliding movement in a perpendicular direction.

Figure 3:
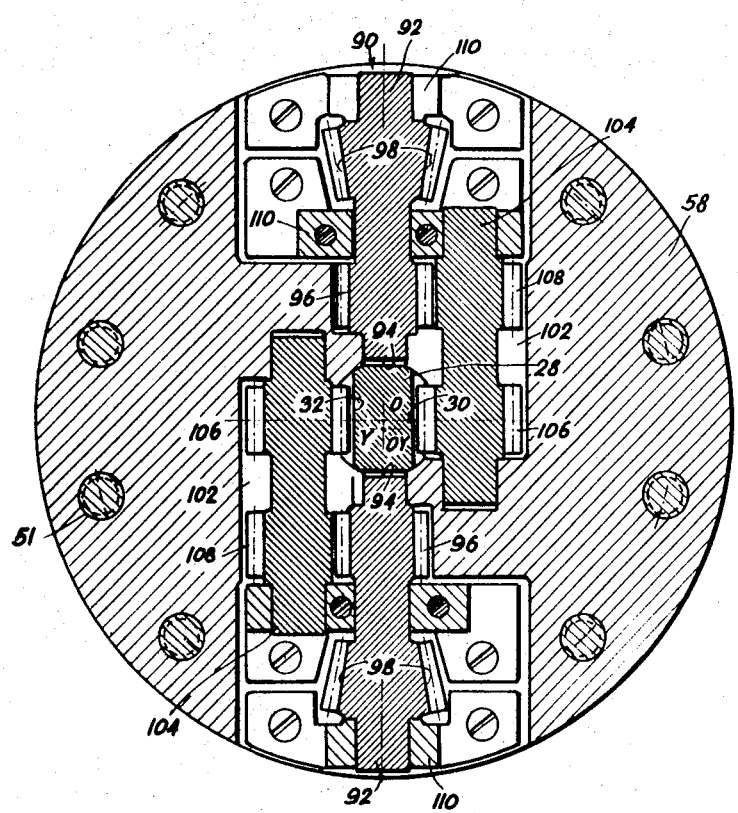
FIG. 3 is a sectional view taken along lines 3—3 of FIG. 1.

The angular adjustment of the bushing 66 about the stem 62 of the support 58 will be seen from reference to FIGS. 1 and 3. The support 58 is provided with a pair of diametrically opposed radially extending bores 90 at an axial position just exteriorly of the central sleeve 26. Mounted within each bore is an axle 92 having a smooth inner end 94 adapted to slide against the upper and lower surfaces respectively of the rack rod 28. Each axle is also furnished with a circular pinion gear 96 adjacent the inner end and a conical gear 98 adjacent its outer end. The conical gear 98 is adapted to engage with and mesh with a correspondingly formed gear train 100 formed on the rearmost face of a base 68 of the bushing 66.

The support 58 is also provided with a second pair of elongated bores 102 located parallel to each other and coplanar with diametrically opposed bores 90 and respectively along the right and left hand sides of the rack rod 28. The right hand bore 102, as seen in FIG. 3, extends outward from the rack rod 28 to the upper of bores 90 while the left hand bore 102 extends between the rack rod 28 and the lower of bores 90. Each bore 102 is provided with an axle 104 having an inner circular pinion gear 106 meshing with the respective rack 30 or 32 and an outer circular pinion gear 108 meshing with the respective pinion gear 96 on the axle 92. Each of the axles 92 and 104 are provided with suitable bearings, bushings or packings 110.

From FIGS. 1 and 3 it will be appreciated that the linear movement of the rack rod 28 transmits via, the racks 30 and 32, pinions 106, 108 and 96, conical gear 98 and meshing gear 100 a rotational or angular movement to the bushing 66, relative to its support 58. Simultaneous, however, because the respective smooth inner end 94 of the axle 92 abuts against the square smooth upper and lower surfaces of the rod 28 and because the bores 90 extend radially and chordally within the support 58 the entire assembly of support 58 and bushing 66 will conjointly rotate about the Y—Y axis. As a result the tool holder 78 can be angular positioned by operation of the screw 40 at the rear of the device, so that its Y—Y axis is adjusted with respect to the X—X axis while being orbitally moved by operation of the drive 22.

Figure 5:
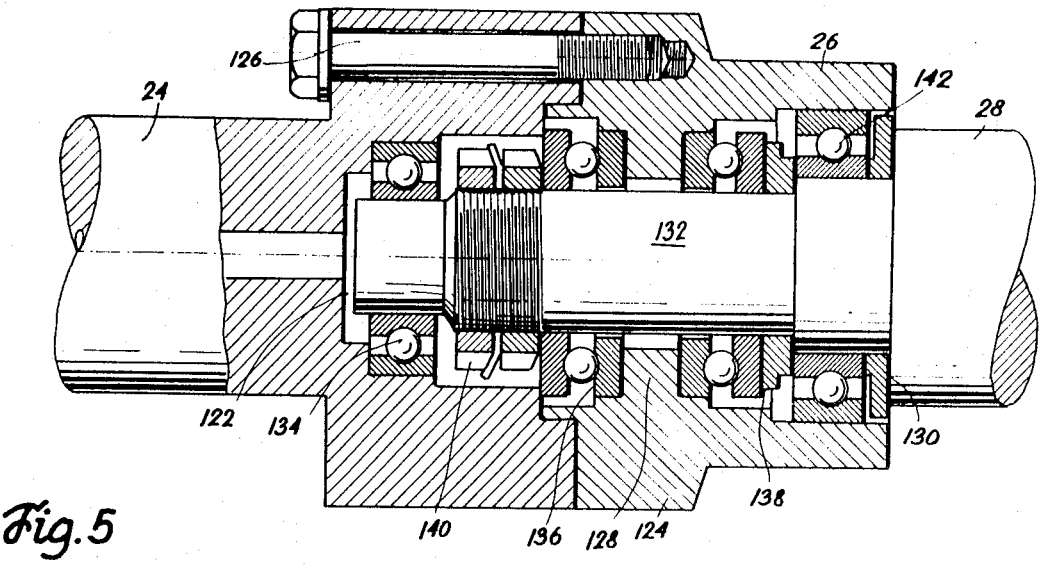
FIG. 5 is an enlarged sectional view of the coupling employed in the device taken along lines 5—5 of FIG. 1.

The coupling 34 between the lead screw 24 and the rod 28, is shown in detail in FIG. 5. The forward extremity of the lead screw 24 is enlarged to form a boss 120 which is provided with a bore 122 axially aligned, along the axis X—X with the interior of the sleeve 26 which is likewise formed with an enlarged boss 124 at its rearward end by which it is connected to the lead screw boss 120 by suitable screw-bolt fasteners 126. The boss 124 of the sleeve 26 is furthermore provided with an integral internal ring 128. The rectangular extension rod 28 is stepped down to form a shoulder 130, at its rearward end, from which extends a journal axle 132 having a series of coaxial circular bearing surfaces. The rearmost bearing surface is mounted within a ball bearing unit 134 located in the boss 120 of the lead screw 24, the central journal portion is mounted with a pair of radial ball bearing units 136 and 138 located on either side of the ring 128 being securely retained by a safety nut 140 threaded to the axle 132, while the forward journal portion is mounted within still another ball bearing unit 142 abutting against the shoulder 130. As will be observed the extreme ball bearing units are arranged to provide rotation, relatively between the axle 132 and bosses 120 and 124, while the bearing units 136 and 138 provide relative rotation with either side of the ring 128. Consequently, both the lead screw 24 and the rectangular rod can be rotated independently of each other while being jointly movable axially along the X—X axis.

In operation a work tool is affixed to the carrier 74 and the drive mechanism 22 is put into action. The gear 20 rotates the spindle 18 driving the support 58, the bushing 66 and consequently through the clutch-like roller and race element 72 which, when the eccentric bushing 66 is neutrally positioned with respect to the stem 62, merely rolls about the cylindrical surface of the bushing in a circular path concentric with the X—X axis. No movement is thus imparted to the tool holder 74. Consequently before starting the machine it is necessary to adjust the eccentric circular rotation of the tool by adjusting the angle of the bushing 66.

For the above purpose the worm gear 40 is manually turned operating the lead screw 24 with resultant linear displacement of the rod 28. The movement of rod 28 rotates the pinion axles 92 and 104 displacing the bushing 66 angularly with respect to stem 62. As seen in FIG. 6, the displacement of the bushing 66 results in displacing the center O (FIG. 6) of the bushing 66 out of coincidence with the X—X axis and moving it in a path Z about the center C of the stem 62 which is concentric with the Y—Y axis. As a result the tool holder 74 begins to perform its orbital movement, while simultaneously maintaining its exact axial alignment within a plane perpendicular to the longitudinal axis X—X.

It will be observed that the tool holder 78 does not rotate in the classical manner about the axis X—X but merely orbits or moves in a closed path within a limited range. This is caused by the fact that the carrier 74 is provided with rectangular guide flanges 80 at its rear end. The radius of orbital movement is variable by adjustment of the worm 40 so to move the bushing 66 between zero to maximum eccentricity as desired.

In general it is necessary to machine electrodes within rather small dimensions, and accordingly the eccentricity of the bushing and stem need only be such that the orbital movement is within such limits. It is preferred that this limit be about or below 1 mm.

Various modifications of the present invention are possible. It is therefore intended that the present description be illustrative only of the invention and not the limiting of it.

I claim:

1. Apparatus for machining electrodes comprising:
   a hollow spindle adapted for rotation about an axis centrally of said spindle,
   means for rotating said spindle,
   a rod mounted within said spindle adapted to move linearly along said first axis,
   means for reciprocatingly moving said rod along said first axis,
   a support drivingly engaged by said spindle for conjoint rotation therewith, said support having a longitudinal axis parallel to, but offset from said first axis,
   a bushing mounted on said support and adapted to hold a work tool for operation on the electrode, said bushing being angularly positionable with respect to said offset axis,
   means connecting said bushing and said rod for angularly adjusting the position of said bushing on said support in response to the linear movement of said rod,
   whereby the work tool may be selectively positioned eccentric with respect to the axis of rotation of said spindle.

2. The apparatus according to claim 1 wherein the support has a hollow bore axially aligned with the rod, the rod having a rack extending within said bore,
   a first pinion mounted within said support transversely adjacent said rod, said first pinion having a first and a second gear at each end respectively,
   a second pinion mounted within said support and extending radially outward therefrom adjacent the bushing supported thereon, said second pinion having a first and a second gear at its inner and outer ends respectively, and
   said bushing having a gear adjacent said second pinion,
   said first gear of said first pinion meshing with said rack, said second gear of said first pinion meshing with the inner gear of said second pinion and said outer gear of said second pinion meshing with the gear of said bushing, whereby linear movement of said rack angularly moves said bushing.

3. The apparatus according to claim 2 including a second rack mounted on the rod on a side opposite said first rack, and a corresponding pair of first and second pinions and associated gears connecting the same to the bushing, said corresponding pair of pinions being located symmetrical with said support with respect to the first and second pinions.

4. The apparatus according to claim 3, wherein said rod is connected to a lead screw including coupling means for translating the rotary motion of said screw into linear motion of said rod, and means for rotating said screw.

5. The apparatus according to claim 4, including a carrier secured to the bushing, said carrier including means for securing a work tool thereto, and means for securing said carrier against axial movement while permitting eccentric rotation thereof.

6. The apparatus according to claim 5, wherein the means for securing the carrier against axial movement includes a frame having a U-shaped cross section, said frame being resiliently mounted to permit movement transverse to the axis of rotation of the carrier, said carrier having a peripheral flange slidingly seated within the bight of said frame.

7. The apparatus according to claim 6, wherein the means for securing the carrier to the bushing includes a pair of opposed inclined race elements, having roller means located therebetween for imparting conjoint rotation in one direction and relative rotation in the other direction.

References Cited

UNITED STATES PATENTS

| | | | |
|---|---|---|---|
| 2,875,557 | 3/1959 | Heynes | 51—119 |
| 2,909,871 | 10/1959 | Heynes et al. | 51—119 |

OTHELL M. SIMPSON, Primary Examiner